United States Patent
Murta et al.

(10) Patent No.: US 9,656,738 B2
(45) Date of Patent: May 23, 2017

(54) AIRFRAME WING SPAR STRUCTURES WITH CONTIGUOUS UNITARY AND INTEGRALLY FASTENED UPPER AND LOWER CHORD SECTIONS

(71) Applicant: EMBRAER S.A., São José dos Campos-SP (BR)

(72) Inventors: Yvan Bovolenta Murta, São José dos Campos (BR); Renato Campos da Silveira, São José dos Campos (BR); Clovis Augusto Eça Ferreira, São José dos Campos (BR); Wanderley Montoro, São José dos Campos (BR)

(73) Assignee: EMBRAER S.A., São José Dos Campos-SP (BR)

( * ) Notice: Subject to any disclaimer, the term of this patent is extended or adjusted under 35 U.S.C. 154(b) by 136 days.

(21) Appl. No.: 14/791,647

(22) Filed: Jul. 6, 2015

(65) Prior Publication Data
US 2017/0008611 A1    Jan. 12, 2017

(51) Int. Cl.
*B64C 3/18* (2006.01)

(52) U.S. Cl.
CPC ............... *B64C 3/185* (2013.01); *B64C 3/18* (2013.01)

(58) Field of Classification Search
CPC .............. B64C 3/18; B64C 3/20; B64C 3/185
See application file for complete search history.

(56) References Cited

U.S. PATENT DOCUMENTS

| | | | | |
|---|---|---|---|---|
| 4,667,905 A | * | 5/1987 | Hamm | B64C 3/18 244/123.13 |
| 6,386,481 B1 | * | 5/2002 | Kallinen | B64C 3/18 244/123.1 |
| 7,740,202 B2 | * | 6/2010 | Namaizawa | B64C 3/18 244/117 R |
| 8,276,848 B2 | * | 10/2012 | Zuniga Sagredo | B64C 3/18 244/123.1 |

* cited by examiner

*Primary Examiner* — Brian M O'Hara
(74) *Attorney, Agent, or Firm* — Nixon & Vanderhye P.C.

(57) ABSTRACT

An aircraft wing is provided having a spanwise wing spar which includes a one-piece upright central web extending in a spanwise direction between inboard and outboard ends of the wing spar, and a plurality of contiguously adjacent wing spar sections. At least a first wing spar section includes at least one upper and lower spar chord which is unitarily formed as a one-piece structure with upper and lower ends of the upright central web, respectively, while at least a second wing spar section includes at least one upper and lower spar chord which is a separate structural element integrally fixed to the upper and lower ends of the upright central web, respectively.

10 Claims, 3 Drawing Sheets

Figure 1:
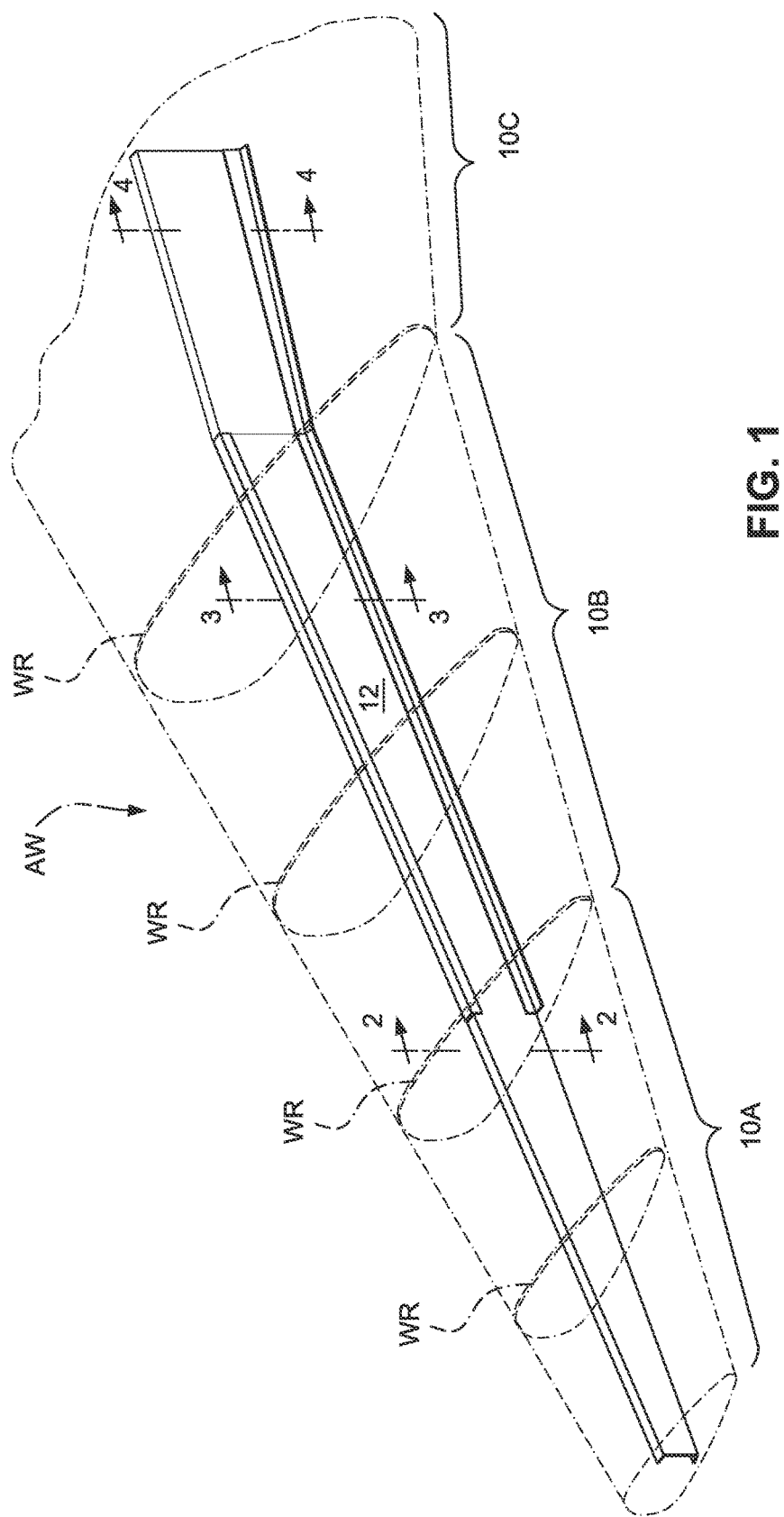

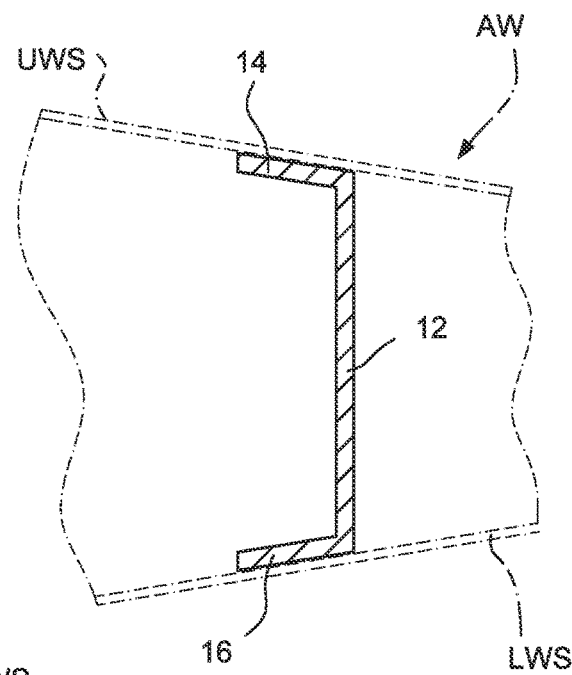
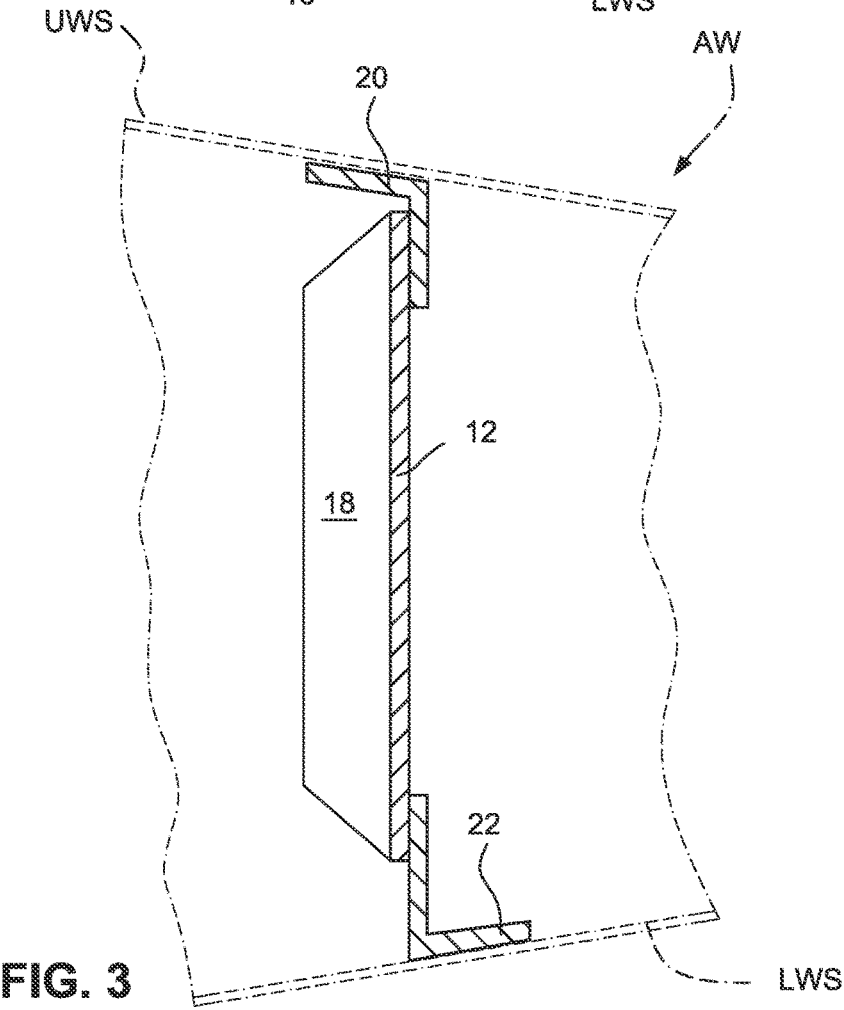

AIRFRAME WING SPAR STRUCTURES WITH CONTIGUOUS UNITARY AND INTEGRALLY FASTENED UPPER AND LOWER CHORD SECTIONS

FIELD

The present invention is related generally to aircraft airframes, particularly to wing spar structures of the airframe. In preferred forms the invention is embodied in airframe wing spar structures having contiguous unitary and integrally fastened upper and lower chord sections.

BACKGROUND

The usual bearing structure of a commercial airplane wing includes an upper skin, a lower skin and two spars connecting both skins. Such spars are commonly made by machining the spar structure (form) out of a metal billet or by fastening the upper and lower chords to a web therebetween.

During design and sizing of spar structures, a plurality of details and analyses must be considered, such as interface with other structural and system components, static strength, stability, fatigue, damage tolerance properties, manufacturing and others.

Airplane wings usually have the spars connected to upper and lower skins by means of fasteners and these four components (front and rear spars) along with the airfoil shape elements (ribs) form the bearing structure of an airplane wing. It is common for such a plurality of structural elements to have conflicting design criteria. For example, the upper skins and upper spar chords must excel in static strength and stability as they are mainly subjected to compression loads. Conversely, the lower skins and lower spar chords are subjected to tension loads and therefore must excel in fatigue and damage tolerance.

Wing spars of commercial transport jets are often machined from an aluminum billet and therefore must meet compression and tension load criteria. Such criteria affect the selection of the spar material and affect the overall structural performance, chiefly increasing weight.

SUMMARY

According to some embodiments, an aircraft wing is provided having a spanwise wing spar which includes a one-piece upright central web extending in a spanwise direction between inboard and outboard ends of the wing spar, and a plurality of contiguously adjacent wing spar sections. At least a first wing spar section includes at least one upper and lower spar chord which is unitarily formed as a one-piece structure with upper and lower ends of the upright central web, respectively, while at least a second wing spar section includes at least one upper and lower spar chord which is a separate structural element integrally fixed to the upper and lower ends of the upright central web, respectively.

Certain embodiments will include each of the upper and lower spar chords of the first wing spar section being unitarily formed as a one-piece structure with the upper and lower ends of the upright central web, respectively.

The upright central web may include a spar stiffener. If provided, the spar stiffener may be formed as a one-piece structure with the upright central web or as a separate structural element which may be fixed to the upright central web (e.g., via (friction stir) welding, riveting or the like).

The second spar section may include an upper spar chord or a lower spar chord which is unitarily formed as a one-piece structure with the upper or lower end of the upright central web, and the remainder chord which is formed as a separate structural element integrally attached to the lower end of the upright central web.

According to some embodiments, an aircraft wing will be provided wherein each of the upper and lower spar chords of the first wing spar section is unitarily formed as a one-piece structure with the upper and lower ends of the upright central web, respectively, and each of the upper and lower spar chords of the second wing spar section is a separate structural element integrally fixed to the upper and lower ends of the upright central web, respectively.

Some embodiments of the aircraft wing will be provided with a wing spar having at least a third wing spar section contiguous with the second wing spar section. If present, the third wing spar section may include an upper spar chord or a lower spar chord which is unitarily formed as a one-piece structure with the upper or lower end of the upright central web, and the remainder spar chord which is formed as a separate structural element integrally attached to the lower end of the upright central web.

The first wing spar section may be an outboard section of the wing spar, the second wing spar section may be a mid-spar section of the wing spar and the third wing spar section may be an inboard wing spar section. An aircraft which includes such wing spars is also contemplated.

These and other aspects and advantages of the present invention will become more clear after careful consideration is given to the following detailed description of the preferred exemplary embodiments thereof.

BRIEF DESCRIPTION OF ACCOMPANYING DRAWINGS

Figure 4:
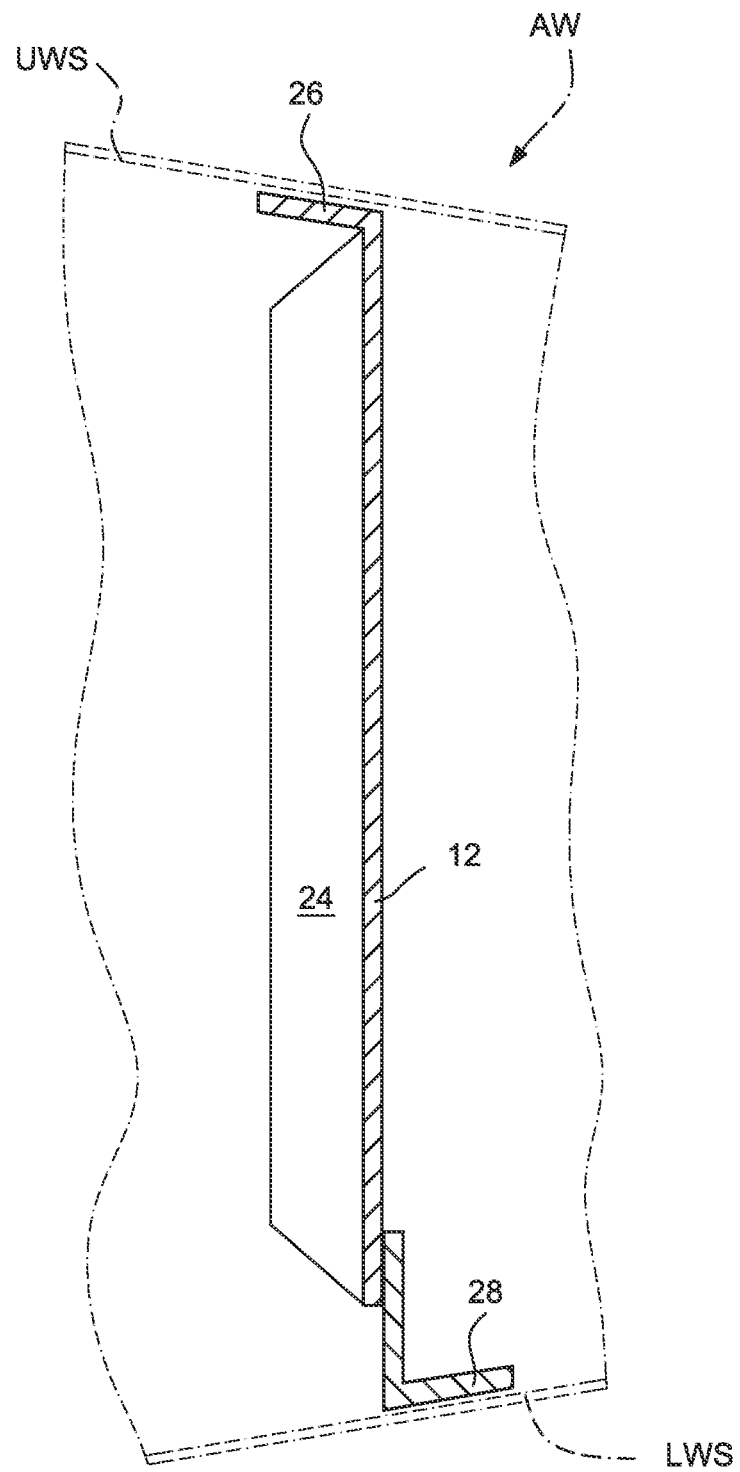

The disclosed embodiments of the present invention will be better and more completely understood by referring to the following detailed description of exemplary non-limiting illustrative embodiments in conjunction with the drawings of which:

FIG. 1 is a schematic aft perspective view of an aircraft wing which includes a spar structure in accordance with an embodiment of the invention; and FIGS. 2-4 are an enlarged cross-sectional elevational views of the wing spar structure as taken along lines 2-2, lines 3-3 and lines 4-4 in FIG. 1, respectively.

DETAILED DESCRIPTION

As shown in the accompanying FIG. 1, an aircraft wing (noted by the chain lines and identified by reference AW) is provided with a spar structure 10 in accordance with an embodiment of the invention. As is conventional, the spar structure 10 is designed to carry the flight and ground loads of the aircraft wing AW. As is also conventional, the aircraft wing AW may be provided with chordwise extending wing rigs WR which define the airfoil cross-section of the wing AW. It will be appreciated that, although a single spar structure 10 is shown in FIG. 1, an aircraft wing AW may be provided with multiple spar structures as may be appropriate for the wing design for a particular aircraft.

Important to the embodiments of the preset invention, the wing spar 10 is comprised of multiple contiguous spar sections which are exemplified by an outboard spar section 10A, a mid-spar section 10B and an inboard spar section 10C in FIG. 1. Specifically, the spar sections 10A, 10B and 10C are provided contiguously adjacent in the spar structure 10 to meet the competing design criteria for the wing as mentioned previously. The spar sections 10A, 10B and 10C share a unitary (one-piece) upright web flange 12 that extends the entire spanwise dimension of the spar 10. In preferred embodiments, the web flange 12 is machined as a one-piece structure from an aluminum billet.

As is perhaps better shown in FIGS. 2-4, each of the spar sections 10A, 10B and 10C may be provided with unitary and/or integrally connected upper and/or lower chord flanges. For example, as shown in FIG. 3, the outboard spar section 10A may be a generally C-shaped wing spar section having unitary upper and lower spar chords 14, 16, respectively. Thus, in addition to the central upright spar web 12, the upper and lower spar chords 14, 16 may be machined from the same aluminum alloy billet so that the web 12, and chords 14, 15 form a one-piece structure with one another. The upper and lower spar chords 14, 16 are attached to the upper and lower wing skins UWS and LWS by conventional means (e.g., friction stir welding (FSW), riveting or the like). Although a C-shaped wing spar section is depicted in FIG. 3, other spar forms may likewise be provided depending on the design needs and criteria for the wing AW.

The mid-spar section 10B is contiguously positioned between the outboard spar section 10A and the inboard spar section 10C. As shown, the central upright spar web 12 of the mid-spar section 10B may be provided with an upright spar stiffener 20 that may either be formed as a one-piece component with web 12 (i.e., such that the stiffener 20 and the web 12 are machined from the same billet), or may be provided as a separate structure but integrated with the web 12 by e.g., welding, riveting or the like. The mid-spar section 10B is also provided with upper and lower spar chords 20, 22. As shown, the spar chords of the mid-spar section are each provided as separate structures which are integrally fixed to the web 12 at its upper and lower ends, respectively.

The inboard spar section 10C, like the spar sections 10A and 10B, includes the unitary upright spar web 12 to which may be attached (or unitarily formed) a spar stiffener 24 (i.e., in a manner similar to the stiffener 20 associated with spar section 10B). As depicted, the upper spar chord 26 is unitarily formed at an upper end of the spar web 12, whereas the lower spar chord 26 is provided as a separate structure which may be integrally fixed to the lower end of the spar web 12.

Various modifications may be envisioned for the embodiment depicted in the accompanying Figures and described above. For example, the integral or one-piece spar chords could be formed on any one of the spar sections 10A-10C as may be required. Furthermore, the spar chords of the spar sections 10A-10C can be either C-shaped, Z-shaped or S-shaped as may be required for the wing design and may or may not include spar stiffeners (which may or may not be unitarily formed with the upright web).

Thus, the invention herein is not to be limited to the disclosed embodiment, but on the contrary, is intended to cover various modifications and equivalent arrangements included within the spirit and scope of the appended claims.

What is claimed is:

1. An aircraft wing comprising a spanwise wing spar, wherein the wing spar includes:
   a one-piece upright central web extending in a spanwise direction between inboard and outboard ends of the wing spar, and
   a plurality of contiguously adjacent wing spar sections, wherein
   at least a first wing spar section includes at least one upper and lower spar chord which is unitarily formed as a one-piece structure with upper and lower ends of the upright central web, respectively, and wherein
   at least a second wing spar section includes at least one upper and lower spar chord which is a separate structural element integrally fixed to the upper and lower ends of the upright central web, respectively.

2. The aircraft wing according to claim 1, wherein each of the upper and lower spar chords of the first wing spar section is unitarily formed as a one-piece structure with the upper and lower ends of the upright central web, respectively.

3. The aircraft wing according to claim 1, wherein each of the upper and lower spar chords of the second wing spar section is a separate structural element integrally fixed to the upper and lower ends of the upright central web, respectively.

4. The aircraft wing according to claim 3, wherein the upright central web includes a spar stiffener.

5. The aircraft wing according to claim 4, wherein the spar stiffener is unitarily formed as a one-piece structure with the upright central web.

6. The aircraft wing according to claim 1, wherein the second spar section includes an upper spar chord which is unitarily formed as a one-piece structure with the upper end of the upright central web, and a lower spar chord which is formed as a separate structural element integrally attached to the lower end of the upright central web.

7. The aircraft wing according to claim 1, wherein
   each of the upper and lower spar chords of the first wing spar section is unitarily formed as a one-piece structure with the upper and lower ends of the upright central web, respectively, and wherein
   each of the upper and lower spar chords of the second wing spar section is a separate structural element integrally fixed to the upper and lower ends of the upright central web, respectively.

8. The aircraft wing according to claim 7, further comprising at least a third wing spar section contiguous with the second wing spar section, wherein the third wing spar section includes an upper spar chord which is unitarily formed as a one-piece structure with the upper end of the upright central web, and a lower spar chord which is formed as a separate structural element integrally attached to the lower end of the upright central web.

9. The aircraft wing according to claim 8, wherein the first wing spar section is an outboard section of the wing spar, the second wing spar section is a mid-spar section of the wing spar and the third wing spar section is an inboard wing spar section.

10. An aircraft which comprises an aircraft wing according to any one of claims 1-9.

* * * * *